United States Patent
McBroom et al.

(10) Patent No.: US 10,001,569 B2
(45) Date of Patent: Jun. 19, 2018

(54) POSITRON EMISSION TOMOGRAPHY DETECTOR ASSEMBLY FOR DUAL-MODALITY IMAGING

(71) Applicant: GENERAL ELECTRIC COMPANY, Schenectady, NY (US)

(72) Inventors: Gary Vernon McBroom, Dousman, WI (US); Adam Clark Nathan, Milwaukeee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 429 days.

(21) Appl. No.: 14/841,022

(22) Filed: Aug. 31, 2015

(65) Prior Publication Data

US 2017/0059720 A1    Mar. 2, 2017

(51) Int. Cl.
| | |
|---|---|
| *G01T 1/20* | (2006.01) |
| *G01T 1/29* | (2006.01) |
| *G01T 1/16* | (2006.01) |

(52) U.S. Cl.
CPC .......... *G01T 1/2985* (2013.01); *G01T 1/1603* (2013.01); *G01T 1/2018* (2013.01)

(58) Field of Classification Search
CPC .... G01T 1/2985; G01T 1/1603; G01T 1/2018
USPC ....................................................... 250/366
See application file for complete search history.

(56) References Cited

U.S. PATENT DOCUMENTS

| | | |
|---|---|---|
| 7,576,330 B1 | 8/2009 | Lacey et al. |
| 7,847,553 B2 | 12/2010 | Schon et al. |
| 8,481,949 B2 | 7/2013 | Martin |
| 2008/0011950 A1 | 1/2008 | Rose et al. |
| 2010/0188082 A1 | 7/2010 | Morich et al. |
| 2013/0184559 A1 | 7/2013 | Corbeil et al. |
| 2013/0284936 A1 | 10/2013 | McBroom et al. |

OTHER PUBLICATIONS

International Search Report and Written Opinion for corresponding PCT application PCT/US2016/047240 dated Nov. 8, 2016; 13 pages.

*Primary Examiner* — David Porta
*Assistant Examiner* — Meenakshi Sahu
(74) *Attorney, Agent, or Firm* — Fletcher Yoder, P.C.

(57) ABSTRACT

A positron emission tomography (PET) detector assembly is provided. The PET detector assembly includes a plate having a first side and an opposite second side, the plate being fabricated from a thermally conductive material. The PET detector assembly also includes multiple PET detector units coupled to the first side of the plate. The PET detector assembly further includes a readout electronics section coupled to the second side of the plate, wherein, during operation, the readout electronics section generates heat that is transferred to the plate. The plate comprises a heat pipe disposed within the plate and configured to extract the heat from the plate and to transfer the heat away from the plate.

20 Claims, 10 Drawing Sheets

POSITRON EMISSION TOMOGRAPHY DETECTOR ASSEMBLY FOR DUAL-MODALITY IMAGING

BACKGROUND

The subject matter disclosed herein relates to imaging systems, and more particularly to a positron emission tomography (PET) detector for a dual-modality imaging system.

In computed tomography (CT), X-ray radiation spans a subject of interest, such as a human patient, and a portion of the radiation impacts a detector where the image data is collected. In digital X-ray systems a photodetector produces signals representative of the amount or intensity of radiation impacting discrete pixel regions of a detector surface. The signals may then be processed to generate an image that may be displayed for review. In the images produced by such systems, it may be possible to identify and examine the internal structures and organs within a patient's body. In CT systems a detector array, including a series of detector elements, produces similar signals through various positions as a gantry is displaced around a patient, allowing volumetric reconstructions to be obtained.

It may be desirable to incorporate the functionality of a PET imaging system and the functionality of the CT imaging system in a dual-modality imaging system. At least one known PET imaging system includes a solid-state detector. The solid state detector includes an array of photodiodes that detect light impulses from an array of scintillation crystals. The photodiodes are typically mounted in close proximity to readout electronics to preserve the signal integrity of the photodiodes. In operation, the readout electronics generate heat that may affect the operation of the photodiodes. Accordingly, it is desirable to provide cooling for the PET detector. However, conventional cooling systems may create an adverse interaction with the CT imaging system. As a result, the addition of the PET detector within the CT imaging system may reduce the image effectiveness of either the CT imaging system or the PET imaging system.

BRIEF DESCRIPTION

In accordance with a first embodiment, a positron emission tomography (PET) detector assembly is provided. The PET detector assembly includes a plate having a first side and an opposite second side, the plate being fabricated from a thermally conductive material. The PET detector assembly also includes multiple PET detector units coupled to the first side of the plate. The PET detector assembly further includes a readout electronics section coupled to the second side of the plate, wherein, during operation, the readout electronics section generates heat that is transferred to the plate. The plate comprises a heat pipe disposed within the plate and configured to extract the heat from the plate and to transfer the heat away from the plate.

In accordance with a second embodiment, a dual-modality imaging system is provided. The dual-modality imaging system includes a computed tomography (CT) imaging apparatus and a PET imaging apparatus. The PET imaging apparatus includes multiple detector assemblies. Each PET detector assembly of the multiple detector assemblies includes a plate having a first side and an opposite second side, the plate being fabricated from a thermally conductive material. Each PET detector assembly also includes multiple PET detector units coupled to the first side of the plate. Each PET detector assembly further includes a readout electronics section coupled to the second side of the plate, wherein, during operation, the readout electronics section generates heat that is transferred to the plate. The plate comprises a heat pipe disposed within the plate and configured to extract the heat from the plate and to transfer the heat away from the plate.

In accordance with a third embodiment, a PET detector assembly is provided. The PET detector assembly includes a plate having a first side and an opposite second side, the plate being fabricated from a thermally conductive material. The PET detector assembly also includes multiple PET detector units coupled to the first side of the plate. The PET detector assembly further includes a readout electronics section coupled to the second side of the plate, wherein, during operation, the readout electronics section generates heat that is transferred to the plate. The PET detector assembly yet further includes a heat pipe disposed within the plate and configured to extract the heat from the plate and to transfer the heat away from the plate. The PET detector assembly still further includes a thermal interface coupled to the heat pipe, wherein the thermal interface is configured to receive the heat being transferred away from the plate, to couple the PET detector assembly to a structure having a coolant circulating through the structure, and to transfer the heat to the structure.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
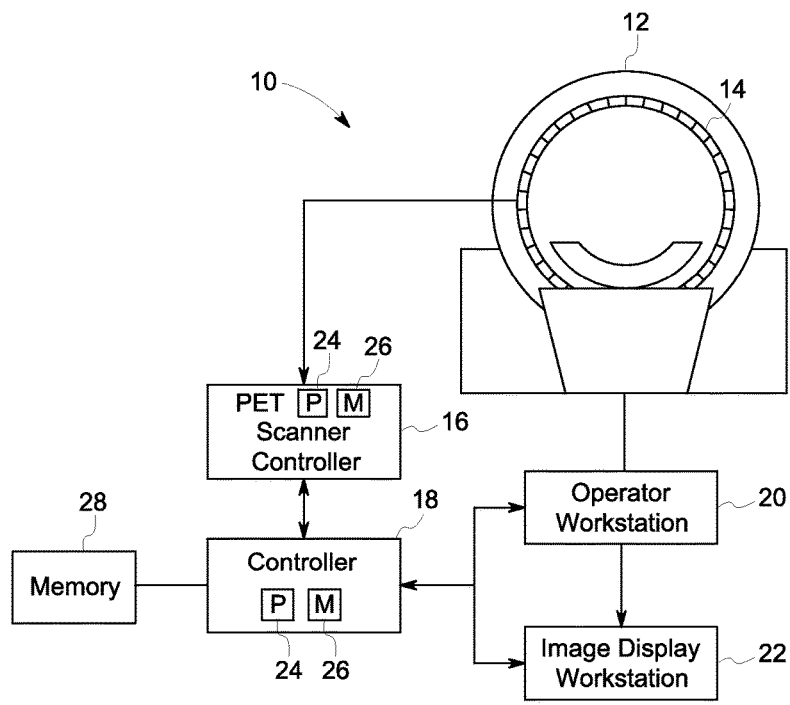
FIG. 1 is a diagrammatical representation of an embodiment of a positron emission tomography (PET) imaging system in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Various embodiments provide a positron emission tomography (PET) detector assembly that may be utilized with a computed tomography (CT) system. The PET detector assembly includes a plate (e.g., thermally conductive plate) having a first side and an opposite second side, the plate being fabricated from a thermally conductive material. The PET detector assembly also includes multiple PET detector units coupled to the first side of the plate. Each PET detector unit includes a photodiode array. The PET detector assembly further includes a readout electronics section coupled to the second side of the plate, wherein, during operation, the readout electronics section generates heat that is transferred to the plate. The plate includes a heat pipe disposed within the plate and configured to extract the heat from the plate and to transfer the heat away from the plate. The heat pipe utilizes both thermal conductivity and phase transition to manage the transfer of heat away from the plate to a thermal interface (e.g., cold interface). The heat pipe includes a working fluid (e.g., water) that upon receiving heat from the plate changes from a liquid to a vapor and upon transferring the heat to the thermal interface condenses back to the liquid. The heat pipe may also include a capillary wick to enable the return of the liquid working fluid to the portion of the heat pipe disposed within the plate. In certain embodiments, the thermal interface is directly coupled to a structure (e.g., cooled structure) that has coolant circulating within it and transfers the heat to the structure. In other embodiments, the thermal interface is coupled to the structure via a thermoelectric cooler (e.g., a Peltier device). In some embodiments, the thermal interface may not be coupled to the cooled structure. Instead, the thermal interface may be coupled to a thermoelectric cooler coupled to a heat sink. These embodiments of the PET detector assembly enable heat generated by the readout electronics to be carried away from the plate so that the PET detector units (in particular, the photodiode array) are not adversely affected (e.g., maintain the PET detector units within an operational temperature range of approximately 19 to 21° C.). This enables the PET detector (e.g., having multiple PET detector assemblies) of the PET imaging system to be utilized with the CT imaging system without reducing the image effectiveness of either imaging system.

With the foregoing in mind and turning now to the drawings, FIG. 1 depicts a PET or SPECT system 10 operating in accordance with certain aspects of the present disclosure. The PET or SPECT imaging system of FIG. 1 may be utilized with a dual-modality imaging system such as a PET/CT imaging described in FIG. 2.

Returning now to FIG. 1, the depicted PET or SPECT system 10 includes a detector 12 (or detector array). The detector 12 of the PET or SPECT system 10 typically includes a number of detector modules or detector assemblies (generally designated by reference numeral 14) arranged in one or more rings, as depicted in FIG. 1, each detector assembly 14 includes multiple detector units (e.g., 3 to 5 detector units or more). As described in greater detail below, each detector assembly 14 is configured to maintain the PET detector units (e.g., photodiode arrays) within an optimal operational temperature range (e.g., approximately 19 to 21° C.) to maintain image effectiveness of the PET or SPECT system 10. The depicted PET or SPECT system 10 also includes a PET scanner controller 16, a controller 18, an operator workstation 20, and an image display workstation 22 (e.g., for displaying an image). In certain embodiments, the PET scanner controller 16, controller 18, operator workstation 20, and image display workstation 22 may be combined into a single unit or device or fewer units or devices.

The PET scanner controller 16, which is coupled to the detector 12, may be coupled to the controller 18 to enable the controller 18 to control operation of the PET scanner controller 16. Alternatively, the PET scanner controller 16 may be coupled to the operator workstation 20 which controls the operation of the PET scanner controller 16. In operation, the controller 18 and/or the workstation 20 controls the real-time operation of the PET system or SPECT system 10. In certain embodiments the controller 18 and/or the workstation 20 may control the real-time operation of another imaging modality (e.g., the CT imaging system in FIG. 2) to enable the simultaneous and/or separate acquisition of image data from the different imaging modalities. One or more of the PET scanner controller 16, the controller 18, and/or the operation workstation 20 may include a processor 24 and/or memory 26. In certain embodiments, the PET or SPECT system 10 may include a separate memory 28. The detector 12, PET scanner controller 16, the controller 18, and/or the operation workstation 20 may include detector acquisition circuitry for acquiring image data from the detector 12, image reconstruction and processing circuitry for image processing, and/or circuitry for regulating the temperature of the detector units of the detector assemblies 14 (e.g., independently regulating the temperature of each detector assembly 14). The circuitry may include specially programmed hardware, memory, and/or processors.

The processor 24 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 24 may include one or more reduced instruction set (RISC) processors or complex instruction set (CISC) processors. The processor 24 may execute instructions to carry out the operation of the PET or SPECT system 10. These instructions may be encoded in programs or code stored in a tangible non-transitory computer-readable medium (e.g., an optical disc, solid state device, chip, firmware, etc.) such as the memory 26, 28. In certain embodiments, the memory 26 may be wholly or partially removable from the controller 16, 18.

By way of example, PET imaging is primarily used to measure metabolic activities that occur in tissues and organs and, in particular, to localize aberrant metabolic activity. In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits positrons that interact with and annihilate complementary electrons to generate pairs of gamma rays. In each annihilation reaction, two gamma rays traveling in opposite directions are emitted. In a PET imaging system 10, the pair of gamma rays are detected by the detector array 12 configured to ascertain that two gamma rays detected sufficiently close in time are generated by the same annihilation reaction. Due to the nature of the annihilation reaction, the detection of such a pair of gamma rays may be used to determine the line of response along which the gamma rays traveled before impacting the detector, allowing localization of the annihilation event to that line. By detecting a number of such gamma ray pairs, and calculating the corresponding lines traveled by these pairs, the concentration of the radioactive tracer in different parts of the body may be estimated and a tumor, thereby, may be detected. Therefore, accurate detection and localization of the gamma rays forms a fundamental and foremost objective of the PET system 10.

Figure 2:
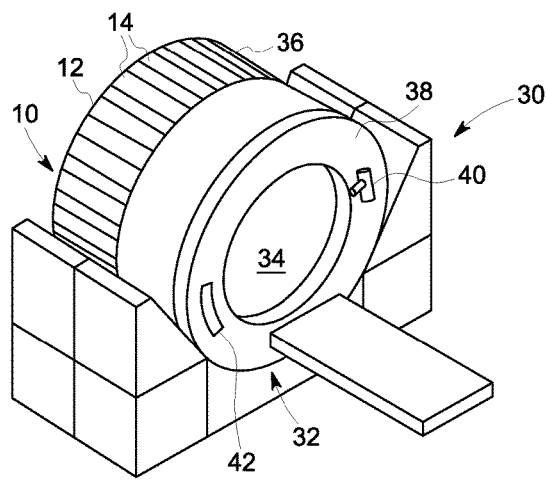
FIG. 2 is a perspective view of a PET/computed tomography (CT) imaging system having the PET imaging system of FIG. 1.

As mentioned above, the PET or SPECT system 10 may be incorporated into a dual-modality imaging system such as the PET/CT imaging system 30 in FIG. 2. Referring now to FIG. 2, the PET/CT imaging system 30 includes the PET system 10 and a CT system 32 positioned in fixed relationship to one another. The PET system 10 and CT system 32 are aligned to allow for translation of a patient (not shown) therethrough. In use, a patient is positioned within a bore 34 of the PET/CT imaging system 30 to image a region of interest of the patient as is known in the art.

The PET system 10 includes a gantry 36 that is configured to support a full ring annular detector array 12 thereon (e.g., including the plurality of detector assemblies 14 in FIG. 1). The detector array 12 is positioned around the central opening/bore 34 and can be controlled to perform a normal "emission scan" in which positron annihilation events are counted. To this end, the detectors 14 forming array 12 generally generate intensity output signals corresponding to each annihilation photon.

The CT system 32 includes a rotatable gantry 38 having an X-ray source 40 thereon that projects a beam of X-rays toward a detector assembly 42 on the opposite side of the gantry 38. The detector assembly 42 senses the projected X-rays that pass through a patient and measures the intensity of an impinging X-ray beam and hence the attenuated beam as it passes through the patient. During a scan to acquire X-ray projection data, gantry 38 and the components mounted thereon rotate about a center of rotation. In certain embodiments, the CT system 32 may be controlled by the controller 18 and/or operator workstation 20 described in FIG. 2. In certain embodiments, the PET system 10 and the CT system 32 may share a single gantry. Image data may be acquired simultaneously and/or separately with the PET system 10 and the CT system 32.

Figure 3:
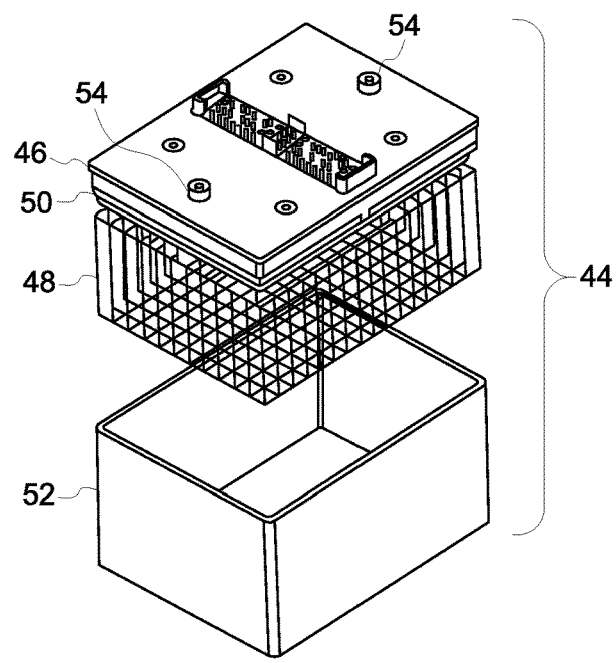
FIG. 3 is a top exploded view of an embodiment a PET detector unit from a first perspective.
Figure 4:
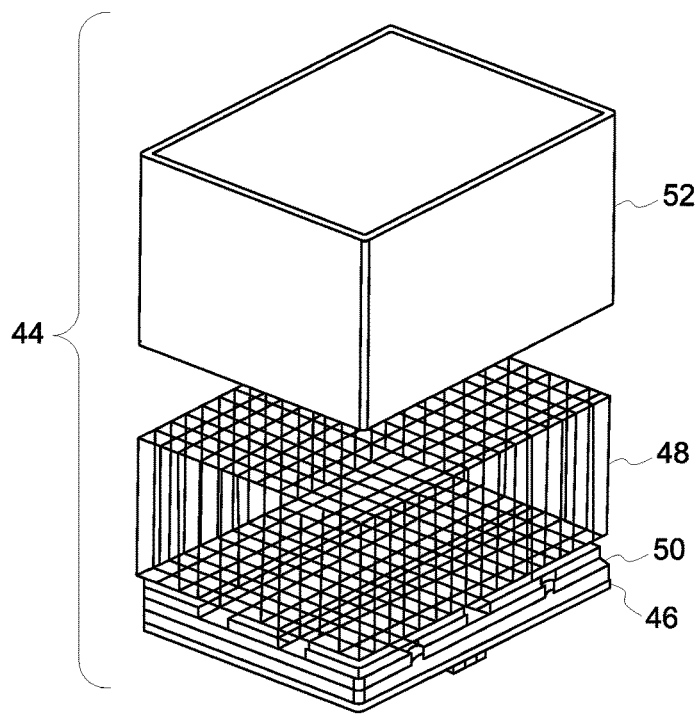
FIG. 4 is a bottom exploded view of the PET detector unit of FIG. 3 from a second perspective.

FIG. 3 is a top exploded view of a PET detector unit 44. FIG. 4 is a bottom exploded view of the PET detector unit 44. As mentioned above, each PET detector assembly 14 of the detector array 12 includes a plurality of detector units 44 (e.g., 3 to 5 or more detectors units 44). Additionally, a plurality of PET detector assemblies 14 may be positioned to form a detector ring arrangement as described above.

In the illustrated embodiment, each PET detector unit 44 includes a base plate 46, a scintillator crystal array 48, photodiode array 50, and a cover 52. The photodiode array 50 is described in more detail below. In various embodiments, the cover 52 is mechanically coupled to the base plate 46, using for example, a plurality of fasteners or an epoxy. In operation, the cover 52 facilitates eliminating or reducing any light or contaminants from contacting the photodiode array 50.

To form the detector assembly 14, a plurality of detector units 44 are each coupled to a plate (e.g., thermally conductive plate) to be described in greater detail below. More specifically, each detector unit 44 includes a plurality of alignment pins 54 that are each configured to be received within a respective opening in the plate. In various embodiments, the alignment pins 54 are formed as part of the base plate 46. In the illustrated embodiment, each detector unit 44 includes two alignment pins 54 and the plate includes two respective openings that are configured to receive a respective pair of the alignment pins 54. Accordingly, if the PET detector assembly 14 is fabricated to include five detector units 44, the plate includes five pairs of openings, wherein each pair of openings is configured to receive a pair of alignment pins 54 for each respective detector unit 44. Accordingly, the alignments pins 54 and the openings enable each detector unit 44 to be properly positioned on the plate to form the detector assembly 14. The detector units 44 are then mechanically secured to the plate using a plurality of mechanical fasteners. In addition to the alignment pins 54, each detector unit 44 includes an electrical connector "plug" extending from the base plate 46. Each respective electrical connector "plug" of the detector units 44 is configured to couple to a corresponding "receptacle" mating connector fitted to the readout electronics board (see readout electronics 64 in FIG. 5). Openings (see openings 88 in FIG. 5) in the cold plate or thermally conductive plate (see plate 56 in FIG. 5) enable the connectors to mate, passing signals from the detector units 44 to the readout electronics in the shortest possible path to preserve signal integrity. The advantage is a short path for electrical signals, while preventing heat from the readout electronics adversely warming the detector units 44.

In various embodiments, the detector unit 44 includes a scintillator block having one or more scintillator crystals that are arranged along an x-axis and a z-axis. In one embodiment, the scintillator block has thirty-six crystals that are arranged in a 4×9 matrix. However, it should be realized that the scintillator block may have fewer than or more than thirty-six crystals, and that the crystals may be arranged in a matrix of any suitable size. In operation, the scintillator crystals are configured to emit absorbed energy in the form of light. The scintillator crystals transmit the light, via a light guide, to an array of light sensors, e.g. silicon photomultipliers (SiPM) configured to receive the optical photons and to convert the optical photons into corresponding electrical signals that are used to reconstruct an image of an object being scanned. More specifically, the electrical signal is transmitted to the readout electronics via the openings. The light sensors may be mounted onto a printed circuit board or any other suitable support structure. In various embodiments, the detector unit 44 may also include at least one application-specific integrated circuit (ASIC) that is configured to receive the outputs from the detector unit 44 and transmit the outputs to the readout electronics. In operation, the outputs include information that enables the readout electronics to determine a point in time at which a photon impinged on a scintillator crystal, also referred to herein as the trigger time. Each output signal also enables the readout electronics to determine the energy of the impinging photon based on the amount of light collected by the light sensors and also determine the position of the scintillator crystal generating the light.

Figure 5:
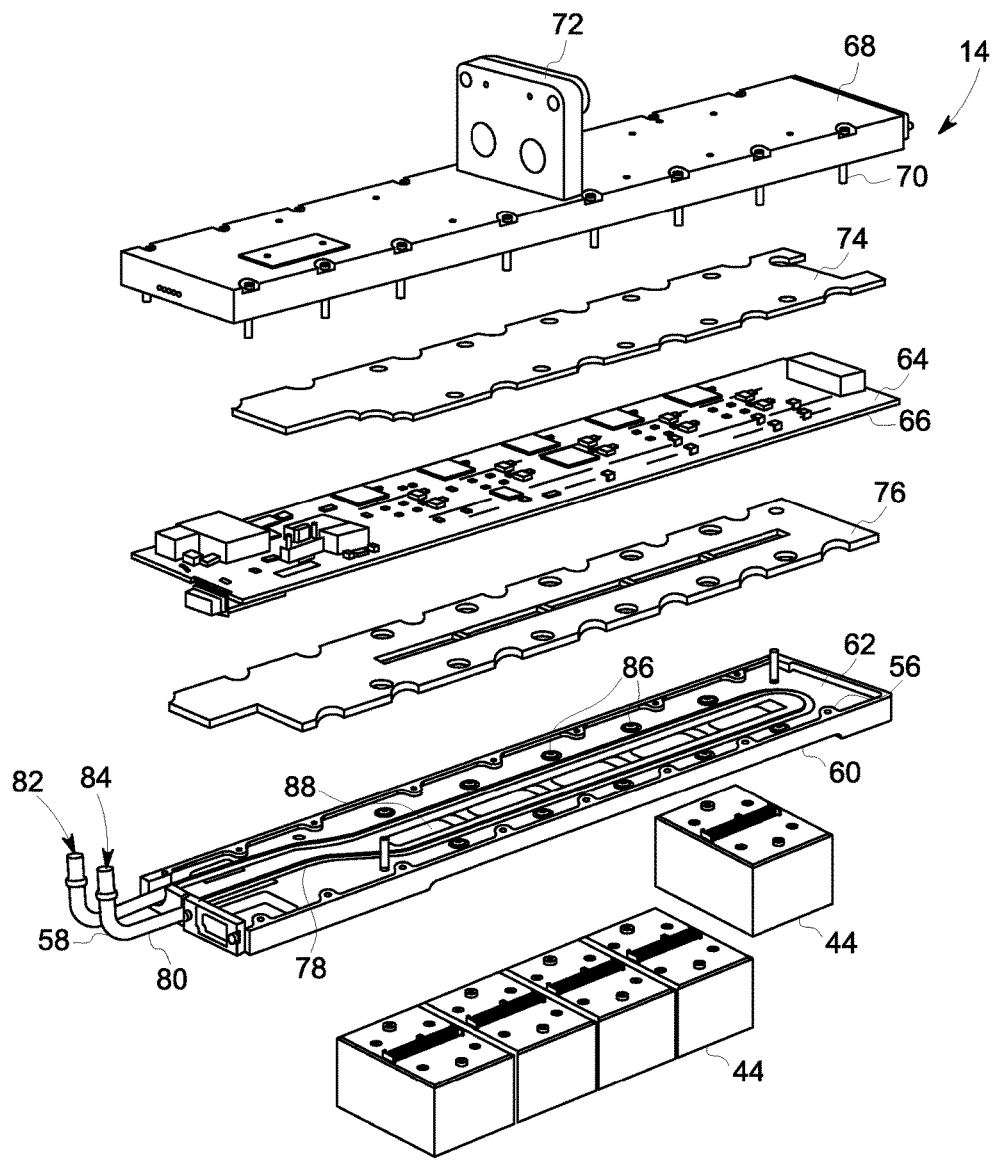
FIG. 5 is a top exploded view of an embodiment of a PET detector assembly having a thermally conductive plate and a cooling tube.

FIG. 5 is a top exploded view of an embodiment of the PET detector assembly 14 having a plate 56 (e.g., thermally conductive plate such as a cold plate) and a cooling tube. The PET detector assembly 14 includes the cold plate 56 having a first side 60 and an opposite second side 62. In various embodiments, a plurality of detector units 44 (e.g., 3 to 5 units 44 or more) are mounted to the first side 60 of the cold plate 56 and a readout electronics section 64, also referred to herein as detector module electronics (DMOD), is mounted to the second side 62 of the cold plate 56. The cold plate 56 enables the detector units 44 to be mounted in close proximity to the readout electronics 64 to preserve the signal integrity of the photodiodes of the detector units 44. A cold plate 56, as used herein, refers to a structural element that is configured to enable a cooling fluid to be transmitted therethrough. In various embodiments, the cold plate 56 is fabricated from a thermally conductive material (e.g., aluminum, thermally conductive plastic or ceramic, etc.) to enable the heat generated by the readout electronics 64 to be dissipated by the cooling fluid transmitted through the cold plate 56. Accordingly, in operation the cold plate 56 facilitates reducing and/or eliminating heat from being transferred from the readout electronics 64 to the detector units 44. Overall, the plate 56 provides structure, alignment (e.g., positional accuracy), and temperature stability for the detector units 44.

In operation, each detector unit 44 is configured to convert gamma rays received by the detector unit 44 into optical photons and convert the optical photons into analog signals that represent the sensed energy of the gamma rays. Moreover, the readout electronics 64 are configured to convert the analog signals into digital signals which may then be utilized to reconstruct an image. Accordingly, in various embodiments, the readout electronics 64 may include a time-to-digital converter that records and digitizes the precise time that each gamma event is detected. The readout electronics 64 may also utilize a plurality of analog-to-digital (A/D) converters that sample the analog signals received from the detector units 44 and convert the analog signals to digital signals for subsequent processing. In various embodiments, the readout electronics 64 may also include, for example, an amplifier to amplify the analog signal prior to being converted to a digital signal by the A/D converters. The readout electronics 64 may be formed on a printed circuit board (PCB) 66 that is then coupled to the first side 60 of the cold plate 56.

The PET detector assembly 14 also may include a cover 68 that is disposed over the readout electronics 64. In operation, the cover 68 is configured to substantially seal the readout electronics 64 within a cavity defined by the cover 68 to substantially eliminate air, water, or any other substance from contacting the readout electronics 64. The cover 68 may be fabricated from aluminum. The cavity formed by the cover 68 and the cold plate 56 forms an RF shield (Faraday Cage) to substantially block or reduce electromagnetic interference from external sources from causing undesirable interference with the operation of the readout electronics 64, and prevents any electromagnetic noise generated by the readout electronics 64 from escaping and potentially causing undesirable interference to the surrounding detectors, the CT system, or other nearby equipment. The cover 68 may be secured or coupled to the cold plate 56 using a plurality of mechanical fasteners 70 (e.g., threaded bolts). In certain embodiments, a tab 72 extends (e.g., perpendicular to a longitudinal axis of the cover 68) from the cover 68. The tab 72 assists in mounting the detector assembly 14 within the detector array 12. The tab 72 may be fabricated from a material with low thermal conductivity (e.g., stainless steel). The tab 72 provides mechanical support without providing a path for heat transfer.

In certain embodiments, the PET detector assembly 14 includes a first gap pad or thermal pad 74 disposed between the cover and the readout electronics 64 and a second gap pad or thermal pad 76 disposed between the readout electronics 64 and the cold plate 56. The gap pads 74, 76 may be fabricated from a compliant material (e.g., putty) that conforms to the respective contours of the cover 68, the readout electronics 64, and the cold plate 56 to ensure no air gaps are present when the detector assembly 14 is assembled. In operation, the gap pad 76 facilitates reducing the operational temperature of the readout electronics 64 by providing a thermal path between the readout electronics 64 and the cold plate 56. The cover 68, the gap pads 74, 76, the PCB 66, and/or the cold plate 56 may include corresponding openings configured to receive the respective mechanical fasteners 70 to secure the respective components to form the detector assembly 14.

In the illustrated embodiment, the cold plate 56 includes a channel 78 formed therein. The cold plate 56 may also include a cooling tube 80 (e.g., copper tube) disposed within the channel 78. The cooling tube 80 has an inlet 82 and an outlet 84. In operation, the cooling tube 80 is utilized to circulate a cooling fluid (e.g., deionized water with biocide inhibitors to inhibit biological growth) within the cold plate 56 to facilitate reducing an operational temperature of the cold plate 56 and therefore reduce the operational temperature of the readout electronics 64 and/or the detector units 44. In certain operations, the detector units 44 may be kept at an operational temperature of approximately 20° C.±1° C. More specifically, the cooling tube 80 is in thermal communication with a cooling system (shown in FIG. 7), via a coolant manifold (shown in FIG. 6), such that a cooling fluid (e.g., water) is provided from the cooling system to the cold plate 56, via the inlet 82, and discharged from the cold plate 56, via the outlet 84 back to the cooling system. In the illustrated embodiment, the cooling tube 80 has a generally U-shaped profile such that the cooling fluid is transmitted through a first side of the cooling tube 80 and discharged from a second side of the cooling tube 80. Thus, the illustrated embodiment is referred to herein as a single-pass cooling loop. Optionally, the cooling tube 80 may form a serpentine pattern such that the cooling fluid makes several passes through the cold plate 56 before being discharged through the cold plate 56. Thus, when the cooling tube 80 has a serpentine pattern, the embodiment is referred to as a multi-pass cooling loop.

The cold plate 56 also includes a plurality of inserts or grommets 86. In various embodiments, the inserts 86 are configured to receive a threaded fastener therein to facilitate coupling the plurality of detector units 44 to the cold plate 56. The cold plate 56 further includes a plurality of openings 88 extending therethrough. In the illustrated embodiments, the openings 88 are located along a central axis of the cold plate 56. The openings 88 enable the various detector units 44 to be electrically coupled to the readout electronics 64. More specifically, the openings 88 enable a connector or other electrical devices on the detector units 44 to be inserted into the openings 88 and then channeled to the readout electronics 64. As depicted, the cold plate 56 includes 5 openings 88, wherein each opening 88 is configured to enable a single detector unit 44 to be electrically coupled to the readout electronics 64.

The cold plate 56 may be formed using any suitable process, such as an injection molding process. More specifically, the cold plate 56 may be molded as a single unitary device. The cold plate 56 may then be machined to include the channel 78, the openings to receive the inserts 86, and the openings 88. The cooling tube 80 may then be inserted into the channel 78 and the inserts 86 inserted into the various openings. In certain embodiments, the cold plate 56 is co-molded to include the cooling tube 80 and/or the inserts 86. More specifically, a mold of the cold plate 56 may be provided. The cooling tube 80 and/or the inserts 86 may be positioned within the mold. A raw material, such as a liquid or powdered plastic, may then be injected into the mold or die to form the cold plate 56. Thus, in various embodiments, the cooling tube 80 and/or the inserts 86 are molded directly into the cold plate 56 and therefore no additionally machining may be utilized. It should be realized that the cold plate 56 may be formed using any suitable fabrication method, (e.g., injection molding, casting, machining, etc).

Figure 6:
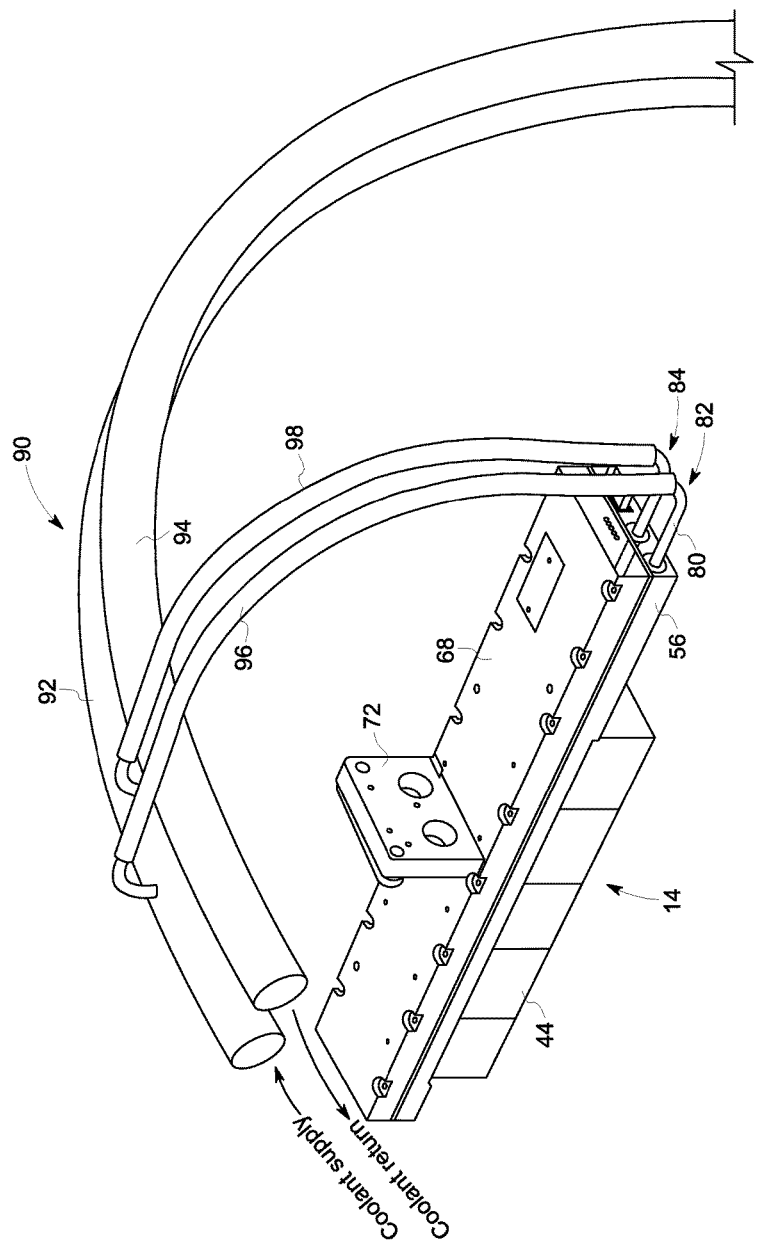
FIG. 6 is a perspective view of an embodiment of the PET detector assembly of FIG. 5 coupled to a fluid manifold of a cooling system.
Figure 7:
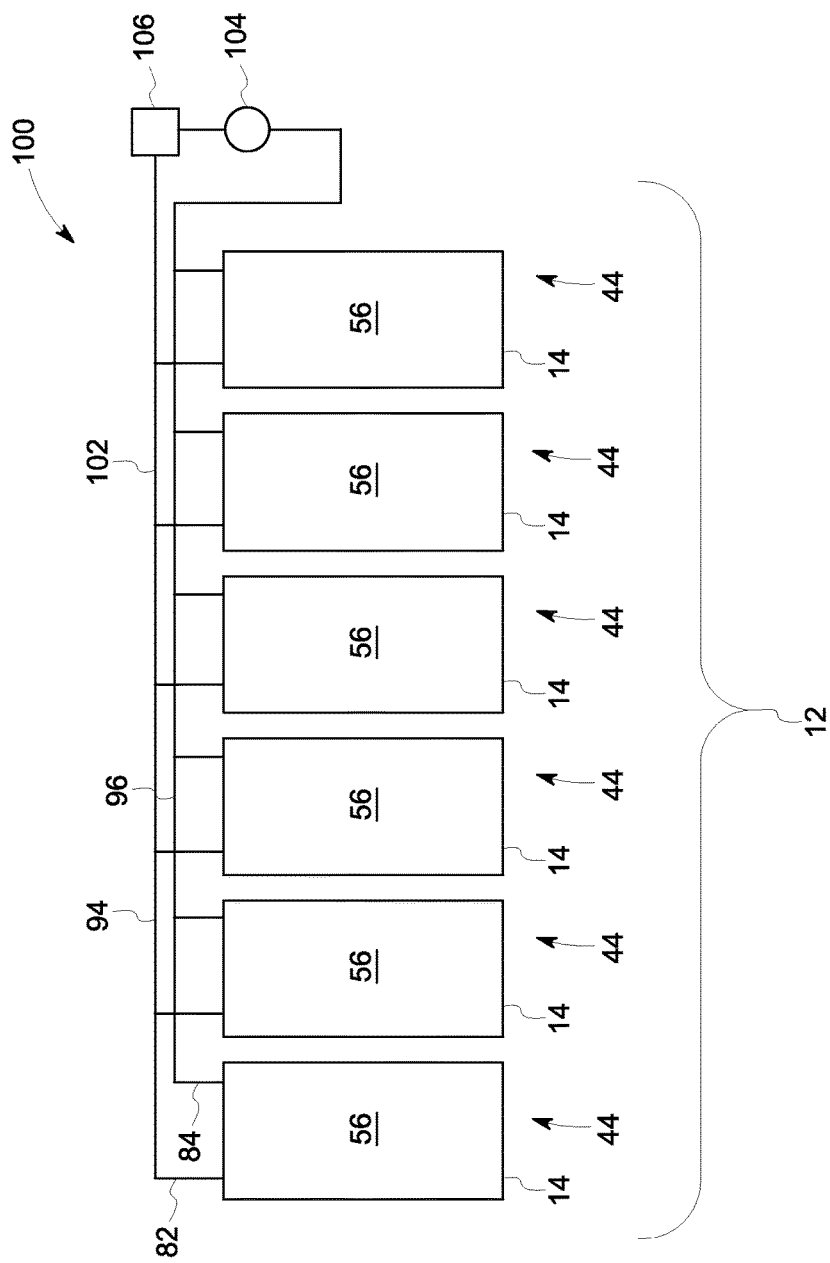
FIG. 7 is a schematic illustration of a cooling system that may be utilized with the detector assembly of FIG. 5.

FIG. 6 is a perspective view of the PET detector assembly 14 of FIG. coupled to a fluid (e.g., coolant) manifold 90 of a cooling system (shown in FIG. 7). The manifold 90 includes a coolant supply conduit 92 (e.g., inlet manifold) and a coolant return conduit 94 (e.g., outlet manifold) coupling the cooling system and the detector assembly 14. The inlet 82 and the outlet 84 of the cooling tube 80 are respectively coupled to the supply conduit 92 and the return conduit 94 via conduits or tubing 96, 98. The cooling fluid (e.g., water) is provided to the cooling tube 80 from the supply conduit 92 via the inlet 82. The cooling fluid is discharge from the outlet 84 to the return conduit 94 after the transfer of heat from the cold plate 56 to the cooling fluid.

FIG. 7 is a schematic illustration of a cooling system 100 that may be utilized to provide a cooling fluid 102 to the respective cold plates 56 of the plurality of detector assemblies 14 of the detector array 12. In the illustrated embodiment, the cooling system 100 includes the inlet manifold 94 coupled to the inlets 82 of the detector assemblies 14 and a discharger or outlet manifold 96 coupled to the outlets 84 of the detector assemblies 14. The cooling system 100 also may include, for example, a pump 104 and a heat exchanger 106. In operation, the pump 104 is configured to channel the cooling fluid 102 through each of the cold plates 56, via the cooling tube 80. The cooling fluid 102 facilitates reducing the operational temperature of the cold plate 56 which in turn reduces the operational temperature of the readout electronics 64 and/or the detector units 44. After the cooling fluid 102 has absorbed the latent heat from the cold plate 56, thus increasing the temperature of the cooling fluid 102, the cooling fluid 102 is channeled through the heat exchanger 106. It should be realized that although FIG. 7 illustrates six detector assemblies 14 coupled to the manifolds 94 and 96, any number of detector assemblies 14 (e.g., 32 detector assemblies 14) may be coupled to the manifolds 94 and 96 and cooled in a manner similar to the illustrated embodiment.

Figure 8:
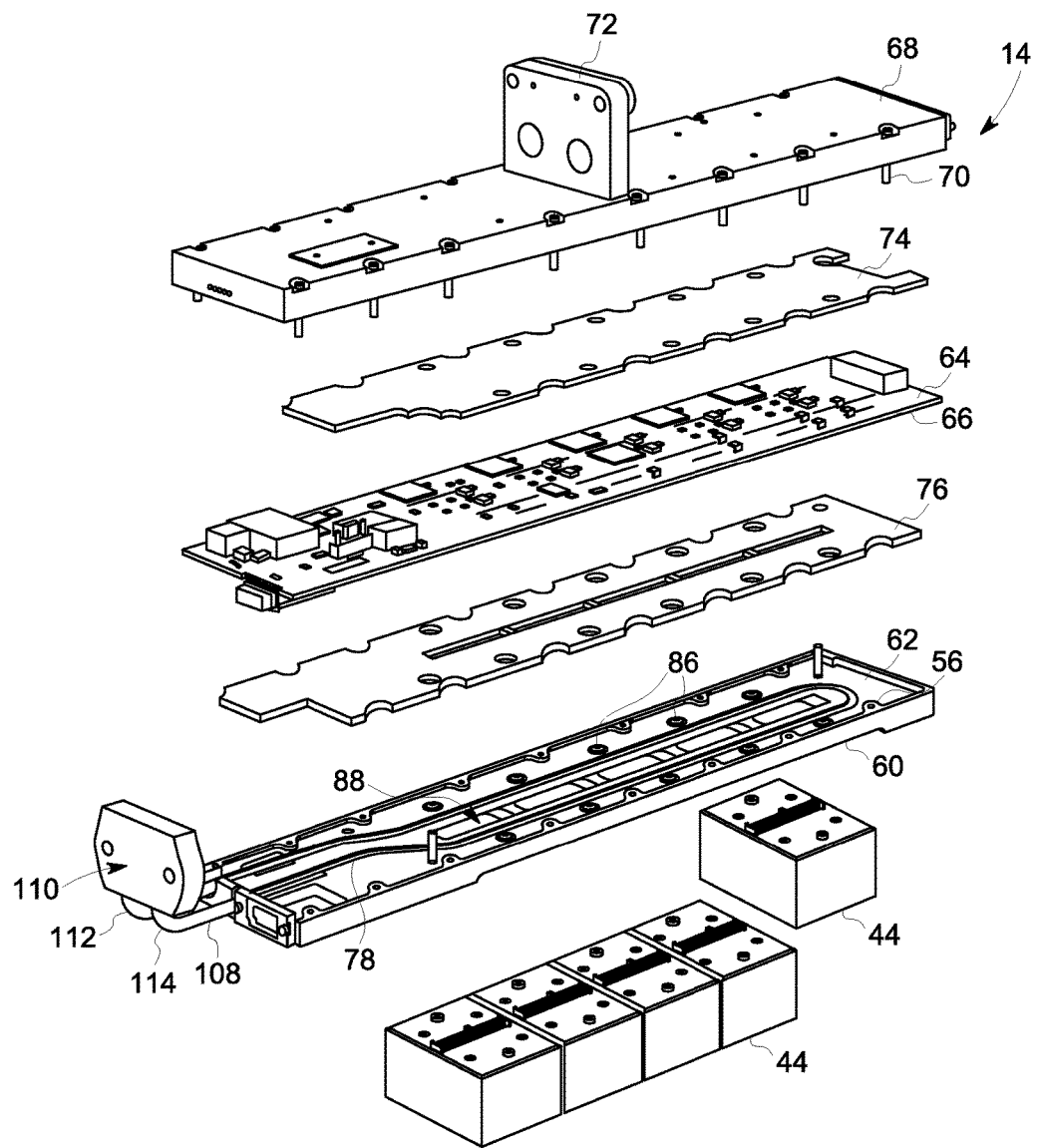
FIG. 8 is a top exploded view of an embodiment of a PET detector assembly having a thermally conductive plate, a heat pipe, and a thermal interface.

As an alternative to the cooling tube 80 and an exchange of the cooling fluid 102 between the cold plate 56 and the cooling system 100, the detector assemblies 14 may utilize a heat pipe to transfer heat from the thermally conductive plate 56. FIGS. 8-12 depict embodiments of detector assemblies 14 including a heat pipe. FIG. 8 is a top exploded view of the PET detector assembly 14 having the thermally conductive plate 56, a heat pipe 108, and a thermal interface 110. In general, the detector assembly 14 is as described in FIG. 5 with the exception having the heat pipe 108, instead of the cooling tube 80, and a thermal interface 110. As depicted, the heat pipe 108 is coupled (e.g., thermally bonded) to the thermal interface 110 via ends 112, 114. In certain embodiments, only one of the ends 112, 114 may be coupled to the thermal interface 110. The heat pipe 108 may include a generally U-shaped shape or a serpentine pattern as described above with regard to the cooling tube 80.

In operation, the heat pipe 108 is configured to extract the heat (e.g., due to operation of the readout electronics 64) from the plate 56 and to transfer the heat away from the plate 56. The heat pipe 108 utilizes both thermal conductivity and phase transition to manage the transfer of heat away from the plate 56 to the thermal interface 110. The heat pipe 108 includes an outer tube or pipe made of a thermally conductive material (e.g., copper) that is sealed. The heat pipe 108 also internally includes a vapor cavity and a working fluid (e.g., water). The working fluid upon receiving heat from the plate 56 changes from a liquid to a vapor (which flows into the vapor cavity), flows through the vapor cavity of the heat pipe 108 to the thermal interface 110 (e.g., cold interface) located away from the plate 56 to transfer the heat to the interface 110, and upon transferring the heat to the thermal interface 110 (e.g., cold interface) condenses back to the liquid. The heat pipe 108 may also include a capillary wick to enable the return of the liquid working fluid to the portion of the heat pipe 108 disposed within the plate 56. In certain embodiments, the thermal interface may be coupled to a coolant-cooled structure or a heat sink as described in FIGS. 9-12.

Figure 9:
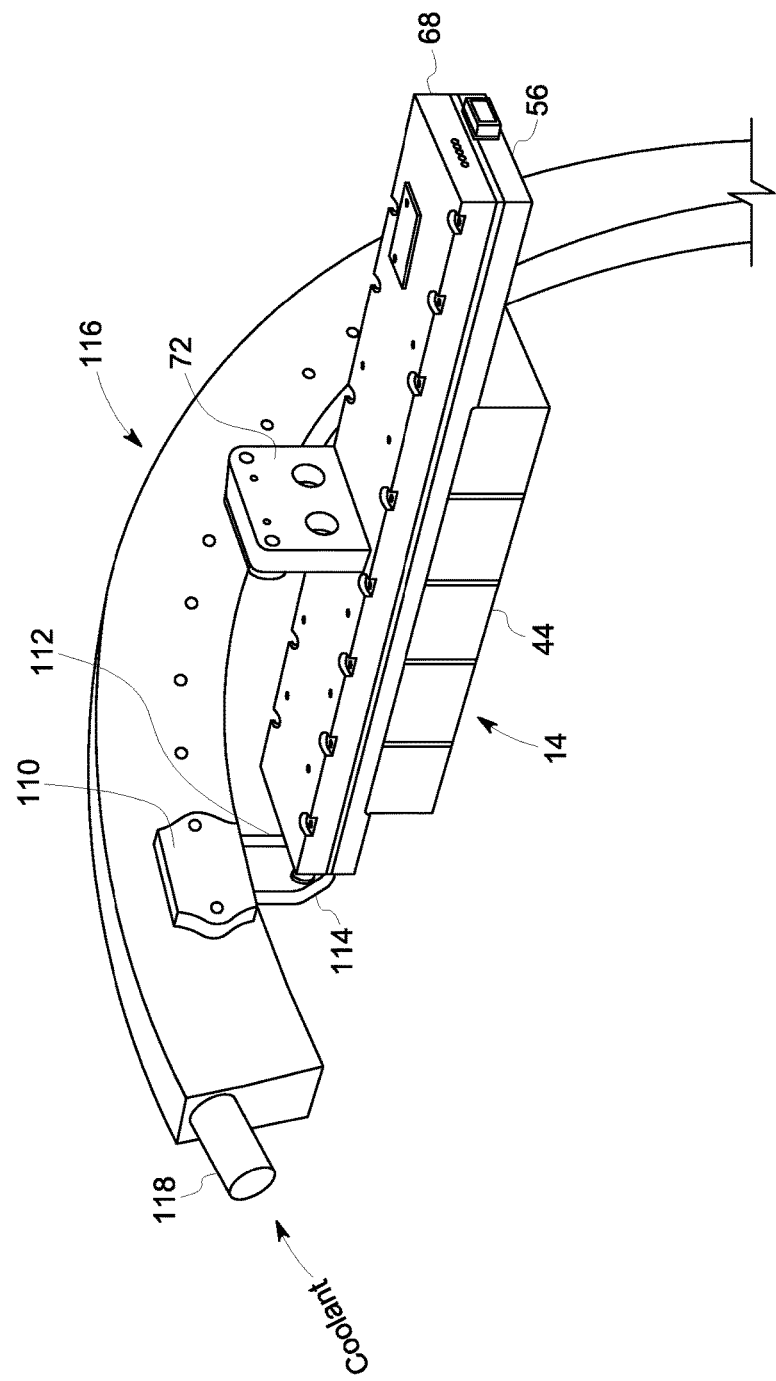
FIG. 9 is a perspective of an embodiment of the PET detector assembly of FIG. 8 directly coupled to a structure (e.g., cooling structure)

FIG. 9 is a perspective of the PET detector assembly 14 of FIG. 8 directly coupled to a structure 116 (e.g., cooling structure). The assembled PET detector assembly 14 is directly coupled to the structure 116 via the thermal interface 110, which is coupled to the structure 116 via mechanical fasteners. The structure 116 may be coupled to a cooling system that circulates coolant (e.g., water) through the structure via a conduit 118. The structure 116 cools the thermal interface 110 so that the vapor working fluid flows towards the thermal interface 110. In addition, the coolant within the structure 116 receives the heat transferred from the heat pipe 108 via the interface 110. The coolant that receives the heat from the interface 110 is channeled via the conduit 118 to a heat exchanger to cool the coolant before it is cycled back through the structure 116. In operation, the plate 56, the heat pipe 108, the thermal interface 110, and the structure 116 operate together to facilitate reducing an operational temperature of the plate 56 and therefore reduce the operational temperature of the readout electronics 64 and/or the detector units 44. In certain operations, the detector units 44 may be kept at an operational temperature of approximately 20° C.±1° C.

Figure 10:
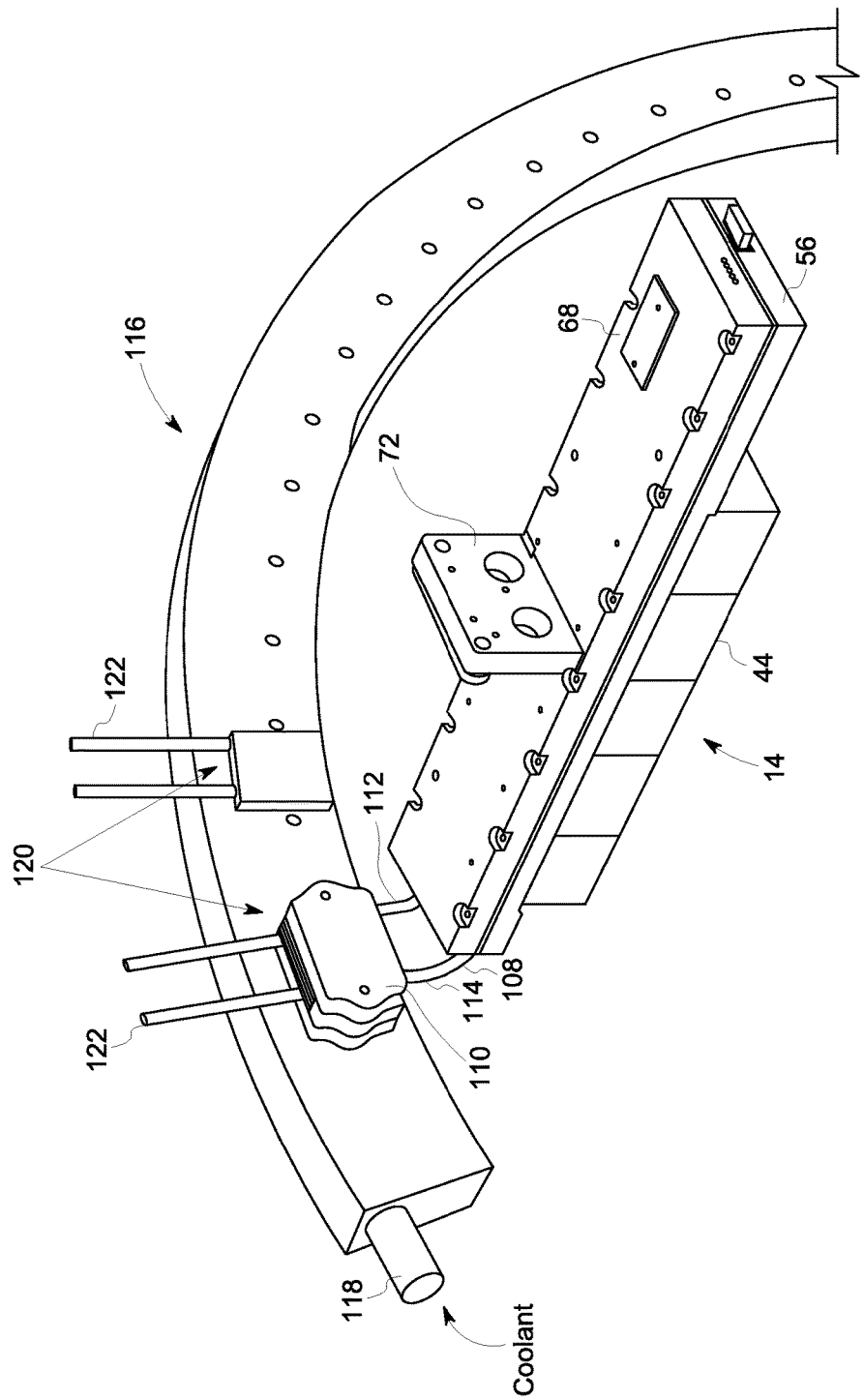
FIG. 10 is a perspective of an embodiment of the PET detector assembly of FIG. 8 coupled to the structure (e.g., cooling structure) via a thermoelectric cooler.

In certain embodiments, the thermal interface 110 may not be directly coupled to the structure 116. FIG. 10 is a perspective of the PET detector assembly 14 of FIG. 8 coupled to the structure 116 (e.g., cooling structure) via a thermoelectric cooler 120. The detector assembly 14 and the structure 116 are as described in FIGS. 8 and 9, except the detector assembly 14 includes a thermoelectric cooler 120 (e.g., Peltier device). In operation, the thermoelectric cooler 120 may transfer heat from the thermal interface 110 (e.g., received from the plate 56 via the heat pipe 108) to the structure 116. The thermoelectric cooler 120 enables the coolant to be run at a warmer temperature (as compared to embodiments without the thermoelectric cooler 120) to minimize or avoid condensation. In addition, the thermoelectric cooler 120 may regulate the temperature of the thermal interface 110 (e.g., to maintain the thermal interface 110 as a cold interface relative to the temperature of the vapor). The thermoelectric cooler 120 may utilize the Peltier effect to regulate the temperature of the thermal interface 110. For example, the thermoelectric cooler 120 may include a first plate or cool side and a second plate or hot side. The thermoelectric cooler 120 creates a temperature differential between the first plate and the second plate via a source of current. Specifically, in certain embodiments, two unique semiconductor materials (e.g., one N-type semiconductor material and one P-type semiconductor material) may be disposed between the plates to generate the temperature differential. For example, a P-type semiconductor material may be placed thermally in parallel and electrically in series with an N-type semiconductor material. When a voltage is applied to the free ends of the two plates, a flow of current across the junction of the plates causes the temperature differential, which results in a heat flux between the plates. The first plate of the thermoelectric cooler 120 may be coupled to the structure 116 and the second plate of the thermoelectric cooler 120 may be coupled to the thermal interface 110.

Each thermoelectric cooler 120 of the respective detector assemblies 114 is coupled to a controller (e.g., controller 18, operator workstation 20, or another component of the PET system 10) that controls the thermoelectric cooler 120 via wires 122. Besides providing active control of the temperature of the respective thermal interface 110 (and thus of the respective heat pipes 108 and the respective plate 56), the thermoelectric coolers 120 enable individual and separate control of the operational temperature of each detector assembly 14.

Figure 11:
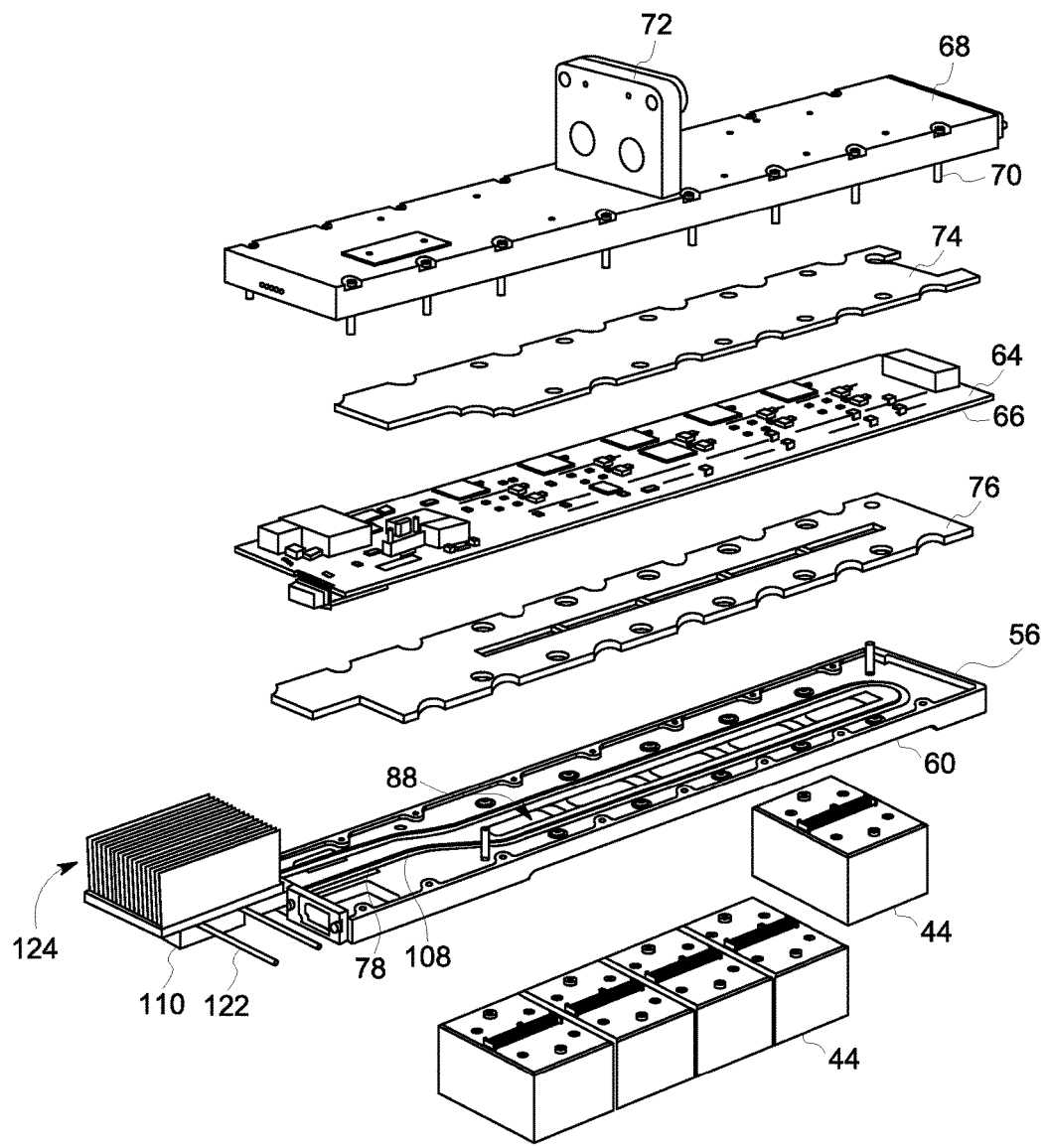
FIG. 11 is a bottom exploded view of an embodiment of a PET detector assembly having a thermally conductive plate, a heat pipe, a thermal interface, a thermoelectric cooler, and a heat sink from a first perspective.
Figure 12:
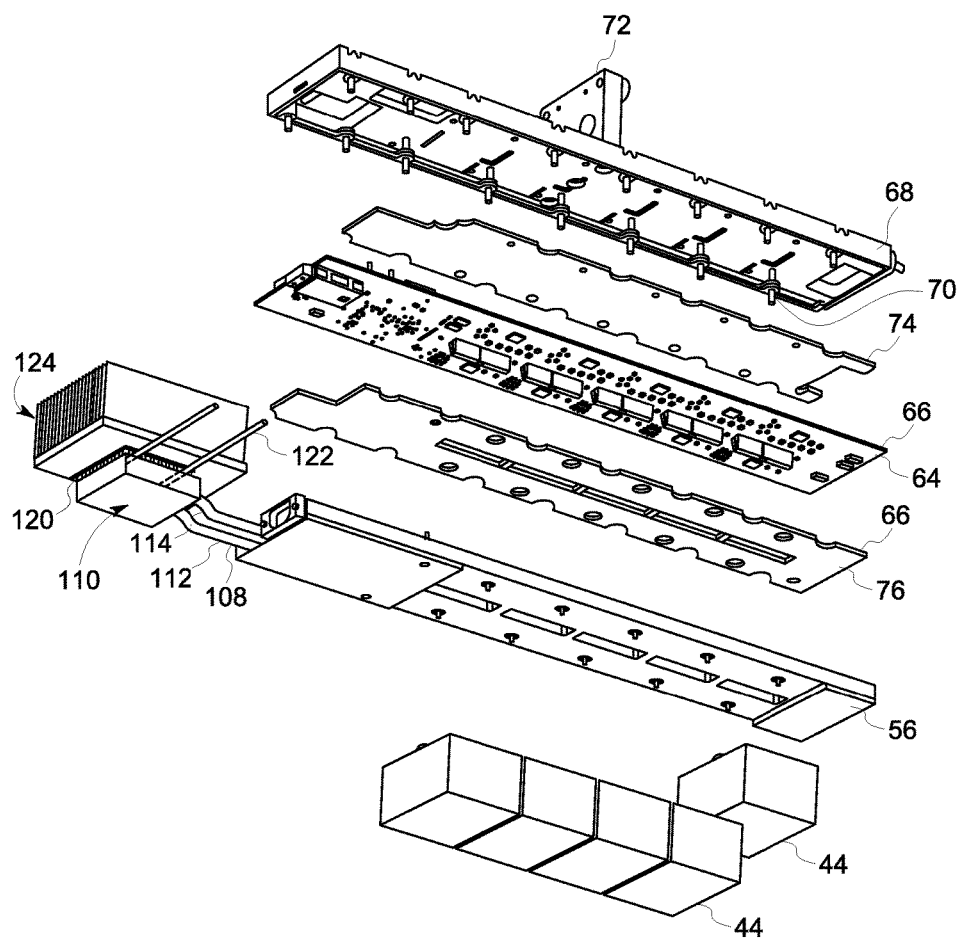
FIG. 12 is a top exploded view of an embodiment of the PET detector assembly of FIG. 11 from a second perspective.

In certain embodiments, the structure 116 may not be utilized in reducing the operational temperature of the plate 56, the readout electronics 64, and/or the detector units 44. FIGS. 11 and 12 are bottom and top exploded views of the PET detector assembly 14 having the plate 56, the heat pipe 108, the thermal interface 110, and the thermoelectric cooler 120, and a heat sink 124. In general, the detector assembly 14 and the thermoelectric cooler 120 are as described in FIGS. 9 and 10, except the thermoelectric cooler 120 is coupled to the heat sink 124 instead of the structure 116. In operation, the heat collected by the thermoelectric cooler 120 from the thermal interface 110 is transferred to heat sink 124. In certain embodiments, the heat sink 124 could include a fan or duct work to transfer rejected heat from the heat sink 124 into the ambient air. As above, the thermoelectric coolers 120 enable individual and separate control of the operational temperature of each detector assembly 14.

Technical effects of the subject matter include providing systems and methods for PET detector assemblies 14 of the PET detector 12 of a dual-modality imaging system (e.g., PET/CT system 30). The PET detector assembly 14 includes multiple PET detector units 44 coupled to the first side 60 of the thermally conductive plate 56 and the readout electronics section 64 coupled to the second side 62 of the plate 56. The plate 56 includes the heat pipe 108 disposed within the plate 56 to extract the heat from the plate 56 and to transfer the heat away from the plate 56 to the thermal interface 110. In certain embodiments, the thermal interface 110 is directly coupled to the structure 116 (e.g., cooled structure) that has coolant circulating within it and transfers the heat to the structure 116. In other embodiments, the thermal interface 110 is coupled to the structure 116 via the thermoelectric cooler 120. In some embodiments, the thermal interface 110 may not be coupled to the cooled structure 116, but may be coupled to the thermoelectric cooler 120 coupled to the heat sink 124. These embodiments of the PET detector assembly 14 enable heat generated by the readout electronics 64 to be carried away from the plate 56 so that the PET detector units 44 (in particular, the photodiode array) are not adversely affected.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A positron emission tomography (PET) detector assembly, comprising:
a plate having a first side and an opposite second side, the plate being fabricated from a thermally conductive material;
a plurality of PET detector units coupled to the first side of the plate; and
a readout electronics section coupled to the second side of the plate, wherein, during operation, the readout electronics section generates heat that is transferred to the plate;
wherein the plate comprises a heat pipe disposed within the plate and configured to extract the heat from the plate and to transfer the heat away from the plate.

2. The PET detector assembly of claim 1, wherein the plate comprises a plurality of openings extending therethrough, each respective opening configured to enable a PET detector unit of the plurality of PET detector units to be coupled to the readout electronics section.

3. The PET detector assembly of claim 1, comprising a thermal interface coupled to the heat pipe, wherein the thermal interface is configured to receive the heat being transferred away from the plate.

4. The PET detector assembly of claim 3, wherein the thermal interface is configured to couple the PET detector assembly to a structure having a coolant circulating through the structure and to transfer the heat to the structure.

5. The PET detector assembly of claim 4, wherein the thermal interface is directly coupled to the structure.

6. The PET detector assembly of claim 4, comprising a thermoelectric cooler coupled to the thermal interface, wherein the thermoelectric cooler couples the thermal interface to the structure and is configured to transfer the heat from the thermal interface to the structure.

7. The PET detector assembly of claim 3, comprising a thermoelectric cooler coupled to the thermal interface, wherein the thermoelectric cooler is configured to pull the heat from the thermal interface.

8. The PET detector assembly of claim 7, comprising a heat sink coupled to the thermal electric cooler, wherein the thermoelectric cooler is configured to transfer the heat from the thermal interface to the heat sink.

9. A dual-modality imaging system, comprising:
   a computed tomography (CT) imaging apparatus;
   a positron emission tomography (PET) imaging apparatus, comprising:
      a plurality of PET detector assemblies, wherein each PET detector assembly of the plurality of PET detector assemblies comprises:
         a plate having a first side and an opposite second side, the plate being fabricated from a thermally conductive material;
         a plurality of PET detector units coupled to the first side of the plate; and
         a readout electronics section coupled to the second side of the plate, wherein, during operation, the readout electronics section generates heat that is transferred to the plate;
         wherein the plate comprises a heat pipe disposed within the plate and configured to extract the heat from the plate and to transfer the heat away from the plate.

10. The dual-modality imaging system of claim 9, wherein at least one PET detector unit of the plurality of PET detector units comprises a base plate, a photodiode array mounted on the base plate, and a cover surrounding the photodiode array and coupled to the base plate.

11. The dual-modality imaging system of claim 9, wherein the plate comprises a plurality of openings extending therethrough, each respective opening configured to enable a PET detector unit of the plurality of PET detector units to be coupled to the readout electronics section.

12. The dual-modality imaging system of claim 9, wherein each PET detector assembly of the plurality of PET detector assemblies comprises a thermal interface coupled to the heat pipe, wherein the thermal interface is configured to receive the heat being transferred away from the plate.

13. The dual-modality imaging system of claim 12, comprising a structure having a coolant circulating through the structure, wherein the thermal interface for each respective PET detector assembly is configured to couple the respective PET detector assembly to the structure and to transfer the heat to the structure.

14. The dual-modality imaging system of claim 13, wherein the thermal interface for each respective PET detector assembly is directly coupled to the structure.

15. The dual-modality imaging system of claim 13, wherein each PET detector assembly of the plurality of PET detector assemblies comprises a thermoelectric cooler coupled to the thermal interface, wherein the thermoelectric cooler couples the thermal interface to the structure and is configured to transfer the heat from the thermal interface to the structure.

16. The dual-modality imaging system of claim 12, wherein each PET detector assembly of the plurality of PET detector assemblies comprises a thermoelectric cooler coupled to the thermal interface, wherein the thermoelectric cooler is configured to pull the heat from the thermal interface.

17. The dual-modality imaging system of claim 16, wherein each PET detector assembly of the plurality of PET detector assemblies comprises a heat sink coupled to the thermal electric cooler, wherein the thermoelectric cooler is configured to transfer the heat from the thermal interface to the heat sink.

18. A positron emission tomography (PET) detector assembly, comprising:
   a plate having a first side and an opposite second side, the plate being fabricated from a thermally conductive material;
   a plurality of PET detector units coupled to the first side of the plate;
   a readout electronics section coupled to the second side of the plate, wherein, during operation, the readout electronics section generates heat that is transferred to the plate;
   a heat pipe disposed within the plate and configured to extract the heat from the plate and to transfer the heat away from the plate; and
   a thermal interface coupled to the heat pipe, wherein the thermal interface is configured to receive the heat being transferred away from the plate, to couple the PET detector assembly to a structure having a coolant circulating through the structure, and to transfer the heat to the structure.

19. The PET detector assembly of claim 18, wherein the thermal interface is directly coupled to the structure.

20. The PET detector assembly of claim 1, wherein the heat pipe extends through the plate between the plurality of PET detector units and the readout electronics section.

\* \* \* \* \*